(12) United States Patent
Fiveland

(10) Patent No.: US 10,113,492 B2
(45) Date of Patent: Oct. 30, 2018

(54) HYBRID COMBUSTION SYSTEM AND METHOD

(71) Applicant: Caterpillar Inc., Peoria, IL (US)

(72) Inventor: Scott B. Fiveland, Metamora, IL (US)

(73) Assignee: Caterpillar Inc., Deerfield, IL (US)

(*) Notice: Subject to any disclaimer, the term of this patent is extended or adjusted under 35 U.S.C. 154(b) by 0 days.

(21) Appl. No.: 15/385,313

(22) Filed: Dec. 20, 2016

(65) Prior Publication Data
US 2018/0171889 A1  Jun. 21, 2018

(51) Int. Cl.
| | | |
|---|---|---|
| *F02D 19/06* | (2006.01) | |
| *F02D 41/30* | (2006.01) | |
| *F02D 41/00* | (2006.01) | |
| *F02B 75/22* | (2006.01) | |
| *F02B 75/12* | (2006.01) | |

(52) U.S. Cl.
CPC ............ *F02D 19/061* (2013.01); *F02B 75/12* (2013.01); *F02B 75/22* (2013.01); *F02D 41/0082* (2013.01); *F02D 41/3017* (2013.01); *F02B 2075/125* (2013.01); *F02D 2200/0614* (2013.01); *F02D 2200/101* (2013.01); *F02D 2200/1002* (2013.01)

(58) Field of Classification Search
CPC .............. F02D 19/061; F02D 41/0082; F02D 41/3017; F02D 2200/0614; F02D 2200/1002; F02D 2200/101; F02B 75/22; F02B 75/12; F02B 2075/125
See application file for complete search history.

(56) References Cited

U.S. PATENT DOCUMENTS

| | | | | |
|---|---|---|---|---|
| 2003/0106520 A1* | 6/2003 | Fiveland | .................. | F02B 1/12 123/294 |
| 2004/0221820 A1* | 11/2004 | Opris | ........................ | F02B 1/12 123/21 |
| 2004/0237514 A1* | 12/2004 | Surnilla | .................. | F02D 17/02 60/299 |
| 2011/0288751 A1* | 11/2011 | Kurtz | .................. | F02D 41/0025 701/109 |
| 2012/0124992 A1* | 5/2012 | Fiveland | .................. | F01N 5/02 60/599 |

(Continued)

FOREIGN PATENT DOCUMENTS

CA           2796463 A1 * 10/2011   ......... F02M 37/0088

*Primary Examiner* — Joseph Dallo
(74) *Attorney, Agent, or Firm* — Leydig, Voit & Mayer, Ltd.

(57) ABSTRACT

An engine having at least a primary and secondary fuel supplies is configured to operate by determining a fueling mode for each of first and second groupings of cylinders, independently. A method, therefore, for operating the engine includes monitoring engine operating parameters with an electronic controller, determining an engine operating point based on the engine operating parameters, calculating a first operating mode of a first cylinder grouping based on the engine operating point, calculating a second operating mode of a second cylinder grouping based on the engine operating point, and selectively activating at least one of a diesel injector, a gaseous fuel injector and a spark device in each engine cylinder separately and selectively for each cylinder of the first and second cylinder grouping based on the engine operating point.

13 Claims, 4 Drawing Sheets

(56) References Cited

U.S. PATENT DOCUMENTS

| | | | |
|---|---|---|---|
| 2012/0210988 A1* | 8/2012 | Willi | F02D 19/024 |
| | | | 123/575 |
| 2013/0019588 A1* | 1/2013 | Richardson | F01N 3/106 |
| | | | 60/274 |
| 2013/0125867 A1* | 5/2013 | Krug | F02M 37/0088 |
| | | | 123/575 |
| 2013/0306029 A1* | 11/2013 | Stockner | F02M 21/0245 |
| | | | 123/445 |
| 2013/0311067 A1* | 11/2013 | Stockner | F02D 19/027 |
| | | | 701/104 |
| 2014/0123937 A1* | 5/2014 | Wickstone | F02D 19/10 |
| | | | 123/299 |
| 2014/0174404 A1* | 6/2014 | Coldren | F02M 21/0287 |
| | | | 123/459 |
| 2015/0020769 A1* | 1/2015 | Huang | F02B 7/08 |
| | | | 123/305 |
| 2015/0247470 A1* | 9/2015 | Rumbel | F02D 19/0647 |
| | | | 123/445 |

* cited by examiner

HYBRID COMBUSTION SYSTEM AND METHOD

TECHNICAL FIELD

This patent disclosure relates generally to internal combustion engines and, more particularly, to engines configured to operate with more than one type of fuel such as diesel and natural gas.

BACKGROUND

Dual fuel engines are known for various applications, such as generator sets, engine-driven compressors, engine driven pumps, machine, off-highway trucks and others. Typically, such engines are stationary and operate in the field. The operation of such engines by substitution of a certain amount of heavy fuel, such as diesel, with a lighter fuel, such as natural gas, biogas, liquid petroleum gas (LPG) or other types of fuel that may be more readily available and cost effective, makes them more effective to operate.

Nevertheless, to achieve desired emission levels, dual fuel engines require emission control systems such as exhaust gas recirculation (EGR) to reduce nitrous oxide (NOx) emissions. EGR systems, like other emission control systems, are generally complex and expensive but required to meet emission levels.

SUMMARY

The disclosure describes, in one aspect, an internal combustion engine. The internal combustion engine includes at least one cylinder case forming a plurality of cylinders, the plurality of cylinders including a first grouping of cylinders and a second grouping of cylinders, each of the plurality of cylinders including a primary fuel injector, a secondary fuel injector and a spark device. The internal combustion engine further includes a primary fuel supply connected to each of the primary fuel injectors and including a primary fuel supply sensor, the primary fuel supply sensor configured to provide a primary fuel supply signal indicative of a rate of supply of a primary fuel to the engine through the primary fuel supply, a secondary fuel supply connected to each of the secondary fuel injectors and including a secondary fuel supply sensor, the secondary fuel supply sensor configured to provide a secondary fuel supply signal indicative of a rate of supply of a secondary fuel to the engine through the secondary fuel supply, an output shaft including a speed sensor, the speed sensor configured to measure an engine speed and to provide a speed signal, and an electronic controller operably associated with each of the primary fuel injectors, each of the secondary fuel injectors and each of the spark devices, the electronic controller disposed to receive the primary and secondary fuel supply signals and the speed signal. The electronic controller is programmed and operates to determine a fueling mode for each of the first and second groupings of cylinders independently based on the primary and secondary fuel supply signals and the speed signal.

In another aspect, the disclosure describes a method for operating an internal combustion engine. The method includes monitoring engine operating parameters with an electronic controller, determining an engine operating point based on the engine operating parameters, calculating a first operating mode of a first cylinder grouping based on the engine operating point, calculating a second operating mode of a second cylinder grouping based on the engine operating point, and selectively activating at least one of a diesel injector, a gaseous fuel injector and a spark device in each engine cylinder separately and selectively for each cylinder of the first and second cylinder grouping based on the engine operating point.

In yet another aspect, the disclosure describes an internal combustion engine that includes at least one cylinder case forming a plurality of cylinders, the plurality of cylinders including a first grouping of cylinders and a second grouping of cylinders, each of the plurality of cylinders including a primary fuel injector, a secondary fuel injector and a spark device, an output shaft including a speed sensor, the speed sensor configured to measure an engine speed and to provide a speed signal, and an electronic controller programmed and operating to determine a fueling mode for each of the first and second groupings of cylinders independently so that the first grouping of cylinders operates in a first fueling mode and the second grouping of cylinders operates in a second fueling mode, the first and second fueling modes being different from one another.

DETAILED DESCRIPTION

Figure 1:
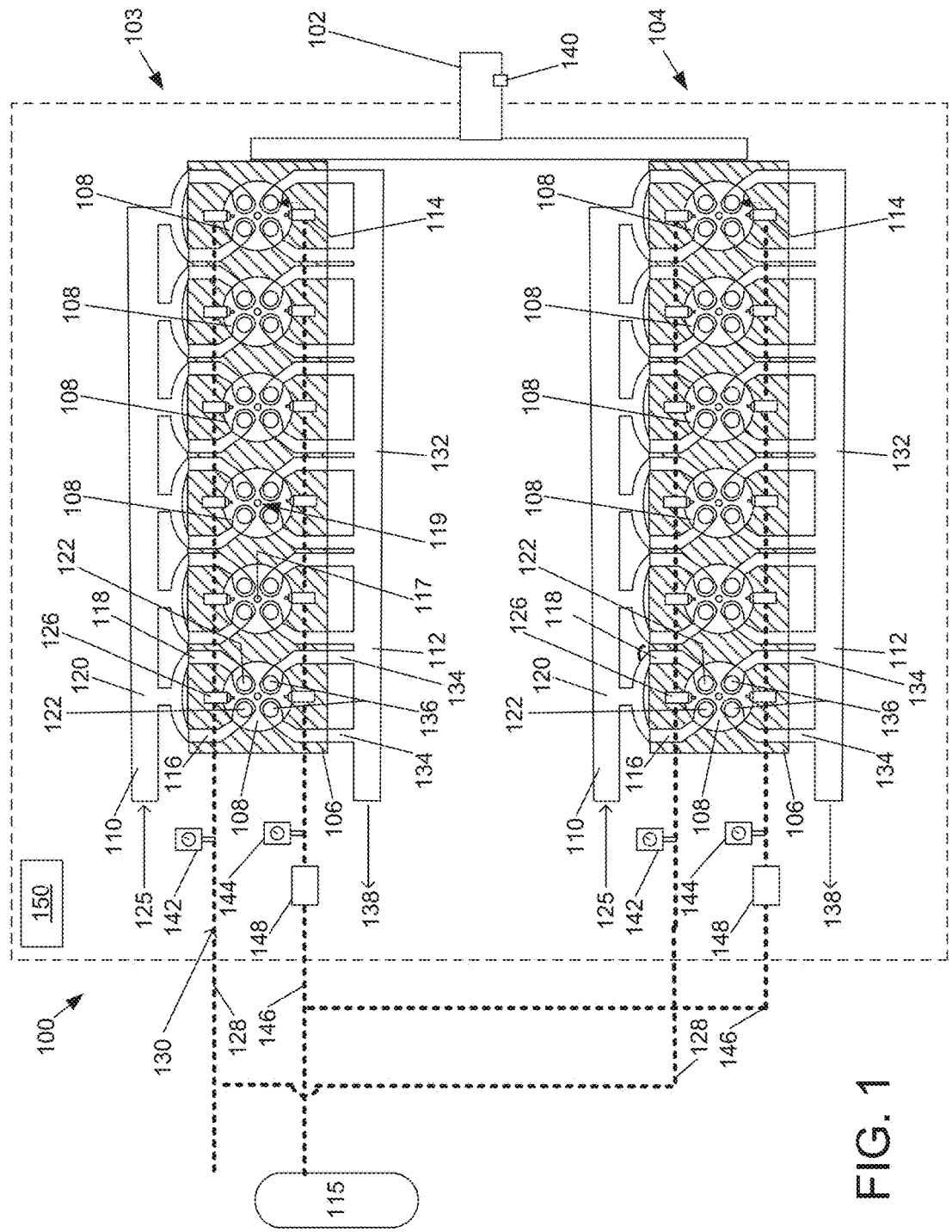
FIG. 1 is a block diagram of an internal combustion engine in accordance with the disclosure.

FIG. 1 is a block diagram representation of an internal combustion engine 100 in accordance with the disclosure. As shown, the engine 100 can be used in stationary applications such as generator or compressor sets, and it can also be used in mobile applications such as off-highway trucks, locomotives and the like. The engine 100 has an output shaft 102 connected between a first engine bank 103 and a second engine bank 104. As can be appreciated, the engine 100 in the configuration shown has a Vee configuration, but the systems and methods in accordance with the disclosure can also be used in engines having different configurations such as an inline engine. In general, the two groupings of engine cylinders in each bank 103 and 104 can be considered as different groupings of engine cylinders in any engine configuration. For example, in an inline engine having six cylinders, a first cylinder grouping can include three cylinders and the second cylinder grouping can include the remaining three cylinders. The cylinders belonging to the different cylinder groupings can be physically positioned adjacent to one another on the engine or separately, for example, with different cylinders belonging to each grouping being located in alternating fashion along the cylinder block.

The engine 100 may further include a controller 105 that is operably associated with various engine and/or generator systems. The controller 105 in the illustrated embodiment includes operable connections to various sensors and systems of the engine 100, and is configured to receive information on the operating parameters thereof as well as send commands to various actuators and systems through the connections. The controller 105 may be a single controller or may include more than one controller disposed to control various functions and/or features of the system. For example, a master controller, used to control the overall operation and function of the generator set may be cooperatively implemented with an engine controller used to control the engine 100. In this embodiment, the term "controller" is meant to include one, two, or more controllers that may be associated with the engine 100 and that may cooperate in controlling various functions and operations of the engine 100. One aspect of the functionality of the controller 105 as it relates to engine fueling, in one embodiment, is shown conceptually in FIG. 2 to include various discrete functions for illustrative purposes only. Such functionality may be implemented in hardware and/or software without regard to the discrete functionality shown. Accordingly, various interfaces of the controller are described relative to components of the engine 100 but such interfaces are not intended to limit the type and number of components that are connected, nor the number of controllers that are described.

Accordingly, the controller 105 in the illustrated embodiment is configured to receive information indicative of various operating parameters of the engine 100 and to control various operating parameters of the engine 100, such as fuel injection timing, allowable or desired fuel substitution rates depending on the operating point of the engine 100 on a per-cylinder basis, and others. The engine 100 may include various components and systems, such as lubrication and electrical systems, which have been omitted from FIG. 1 for simplicity. Relevant to the present disclosure, the engine 100 includes a cylinder case 106 having one or more combustion cylinders 108 formed therein. As shown, each grouping of cylinders of the respective first and second banks 103 and 104 includes six cylinders 108, but any other number of cylinders arranged in different configurations, such as an inline configuration, may be used.

Each cylinder 108 includes a reciprocable piston defining a combustion chamber that is connectable to respective intake manifolds 110 and exhaust manifolds 112 arranged on each cylinder bank or grouping 103 and 104. Each cylinder 108 includes a direct-injection diesel injector 126. The diesel injectors 126 are connected to a source of pressurized diesel fuel, which provides fuel to each injector 126 via a diesel fuel line 128. Each injector 126 is configured to inject a predetermined amount of diesel fuel 130 into each cylinder 108 in response to an appropriate command from the controller 105 during engine operation. For example, the controller 105 may be configured to receive timing information from the engine 100, which is used to determine the appropriate injection timing for each combustion cylinder 108.

The engine 100 further includes a secondary fuel injector 114 disposed to inject a predetermined amount of fuel into the intake manifold 110. In the illustrated embodiment, for example, the secondary fuel injector 114 is a gas fuel injector 114 that is operably connected to a supply of gaseous fuel or reservoir 115, which may be a tank reservoir or may alternatively be a pressure regulated supply from a field source, such as biogas from a land fill, natural gas from an oil well and the like. The gas fuel injector 114 operates to deliver a predetermined amount of gaseous or another secondary fuel into the intake manifold 110. The fuel delivered mixes with incoming air 125 to form an air/fuel mixture that is admitted into the cylinders 108 via intake valves 122.

During operation, an air/fuel mixture from the intake manifold 110 is admitted into each cylinder 108. Diesel fuel is injected into each cylinder 108 at the appropriate time and duration during engine operation to provide a richer air/fuel mixture than what is already present in the cylinder 108. Compression of this mixture within the cylinder 108 causes auto-ignition of the diesel fuel found therein, which initiates combustion of all combustible fuels found the in the cylinder. This includes the diesel fuel as well as the secondary fuel that was previously delivered to the intake manifold by the secondary fuel injector 114.

The auto-ignition of diesel fuel provided by each injector 126 causes the combustion of an air/fuel mixture present in a compressed state in each cylinder 108. Each cylinder 108 is configured to selectively receive air from the intake manifold 110, which may be at or below atmospheric pressure for a naturally aspirated engine, or may alternatively be under positive gage pressure in a turbocharged or supercharged engine. In the illustrated embodiment, the engine 100 may further include a turbocharger (not shown) that is fluidly connected in the known configuration between the intake and exhaust manifolds 110 and 112. In the present disclosure, each cylinder 108 is independently controlled by the controller 150 such that a different ratio and type of fluid and, thus, a different combustion system, may be selectively used for some cylinders and not others. In the illustrated embodiment, for example, the cylinders in the first grouping of cylinders 103 may operate entirely on diesel fuel, while the cylinders in the second grouping of cylinders arranged along the second bank 104 may operate in a mixed diesel/gas mode, or in a mode that operates the cylinder entirely on gaseous fuel. To that end, a spark source 117 such as a spark plug may be used in each cylinder 108. In certain embodiments, each cylinder may further include a cylinder pressure sensor and/or a detonation sensor 119, each of which may be a standalone sensor that is associated with each respective cylinder and/or a sensor that is integrated with another component such as the spark device 117.

During operation, air from the intake manifold 110 is provided to each cylinder 108 via, respectively, first and second intake ports 116 and 118. The first and second intake ports 116 and 118 of each cylinder 108 may be directly connected to an intake plenum volume 120 of the intake manifold 110 or may alternatively be branches of a combined intake port (not shown) that is fluidly open to the intake plenum volume 120. A first intake valve 122 is disposed to fluidly isolate the cylinder 108 from the first intake port 116, and a second intake valve 122 is similarly disposed to fluidly isolate the cylinder 108 from the second intake port 118. When the first and second intake valves 122 are closed, such as during combustion of the air/fuel mixture in the cylinder 108, fluid communication between each respective cylinder 108 and the intake manifold 110 is blocked. Similarly, at least partial opening of either the first and/or second intake valve(s) 122 permits the fluid communication of the cylinder 108 with the intake plenum volume 120 such that air 125 may enter the cylinder 108. The combustion of the air/fuel mixture in the cylinder 108 produces power, which is transferred as torque to the output shaft 102. Indications and/or signals related to the presence, quality and intensity of combustion in each cylinder may be provided by appropriate sensors to an electronic controller of the engine.

Exhaust gas remaining after the combustion of fuel from each injector 126 with air from the first and second intake ports 122 within each cylinder 108 is evacuated and collected in the exhaust manifold 112. In the illustrated embodiment, each cylinder 108 is fluidly connectable to an exhaust plenum volume 132 via two exhaust ports 134. Each exhaust port 134 is fluidly isolatable from the cylinder 108 by a corresponding exhaust valve 136. The exhaust gas 138 collected is removed from the exhaust manifold 112. Although two exhaust valves 136 are shown corresponding to each cylinder 108, a single exhaust valve disposed in a single exhaust port per cylinder 108 may be used.

The engine 100 includes various sensors that are relevant to the present disclosure. More particularly, an engine speed sensor 140, which is generically illustrated in FIG. 1, is associated with the output shaft 102 and configured to measure a parameter indicative of a rotational speed, for example, in revolutions per minute (RPM), of the engine 100, and provide a signal indicative of the RPM to the controller 150. A diesel flow sensor 142 is associated with the diesel fuel line 128 and configured to measure one or more parameters indicative of a flow rate, pressure and/or other parameters of the diesel fuel that is provide to the injectors 126 during operation of the engine 100. Additionally, a determination of the total fuel flow rate of diesel fuel may be carried out within the electronic controller 105 based on an aggregate of known diesel injection amounts that are provided by each injection event. Alternatively, a determination of the engine load may be carried out on the basis of one or more signals provided from a cylinder pressure and/or detonation sensor such as the sensor 119 (FIG. 1), which may provide a signal of the pressure within the cylinder and/or the rate and timing of combustion. In one alternative embodiment, the basis for fuel delivery determination may be made on the basis of each engine stroke or each fuel injection event, and for each cylinder, rather than in the aggregate. When the diesel flow sensor 142 is used, the information or signals indicative of the flow rate of diesel fuel provided to the engine 100 is/are communicated either directly or indirectly to the controller 105. Additional sensors may be used, such as airflow, air pressure and/or oxygen concentration sensors (not shown) configured to measure parameters of the incoming airflow 125.

A flow sensor 144 for the secondary fuel, in this case, a gaseous fuel, is associated with a secondary fuel supply line 146 at a location downstream from a secondary fuel flow control valve 148. In an embodiment where the secondary fuel is a gas as shown, for example, in FIG. 1, the control valve 148 may be operably associated with the controller 105 and configured to meter the flow of fuel from the reservoir 115 to the injector 114 in response to appropriate signals from the electronic controller 105. The secondary fuel flow sensor 144 may be located anywhere along the fuel line 146. In the illustrated embodiment, the fuel flow sensor 144 is located downstream of the control valve 148. The secondary fuel flow sensor 144 may be any appropriate type of digital or analog output sensor that is configured to provide a signal to the electronic controller 105 that is indicative of the mass flow or volume flow rate of gaseous fuel provided to at least some of the engine cylinders 108 through the respective injectors 114 during engine operation.

Figure 2:
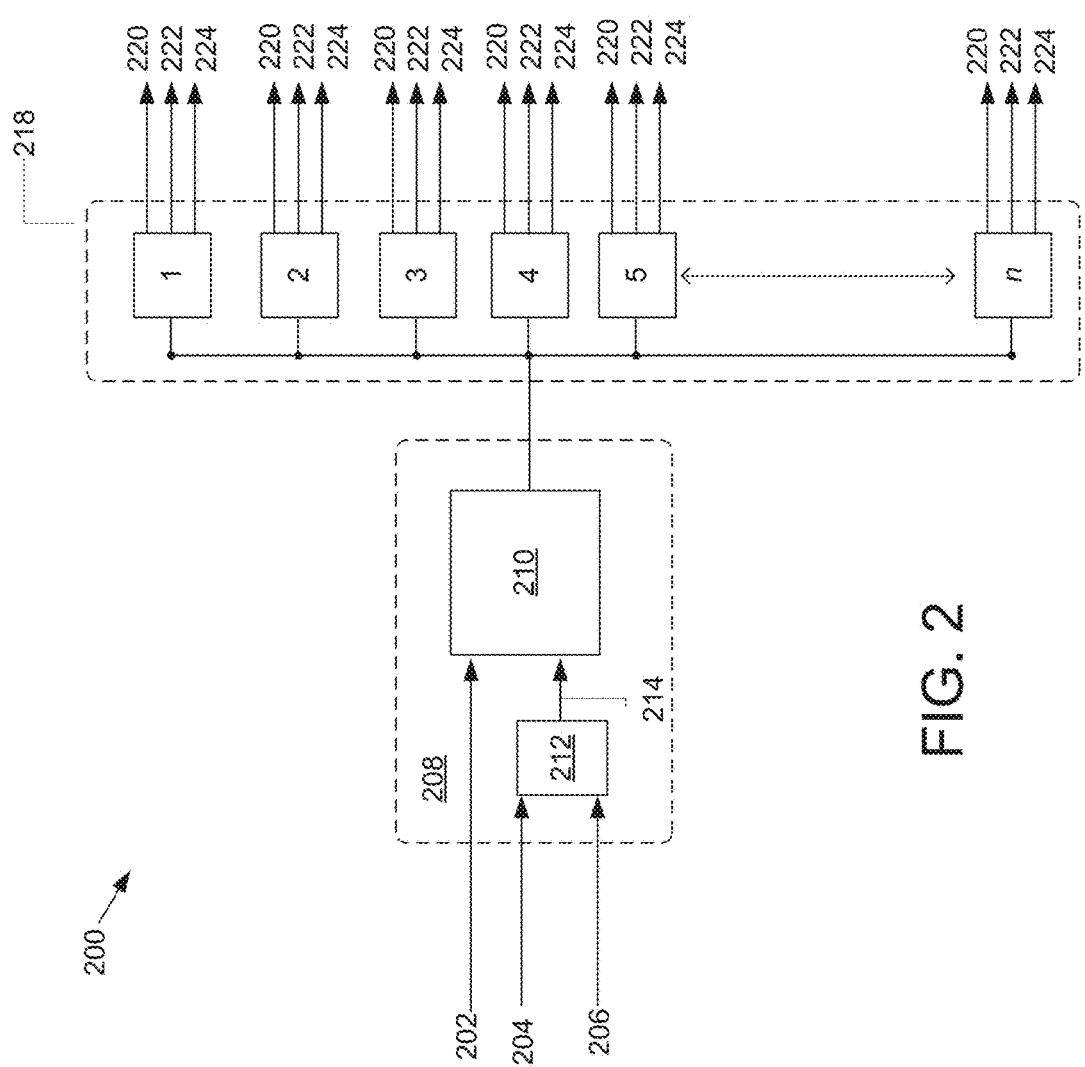
FIG. 2 is a block diagram of an engine controller in accordance with the disclosure.

A block diagram for a controller 200 is shown in FIG. 2. The controller 200 may be part of a larger control scheme for controlling and monitoring the operation of the engine 100 (FIG. 1). The controller 200 may be further integrated with and be operating within the electronic controller 105 (FIG. 1) such that inputs and outputs of the controller 200 are signals present within the electronic controller 105.

The controller 200 operates to provide instructions for operating each cylinder of the engine separately and independently from the others relative to the type of combustion that will be carried out in each cylinder. Specifically, the controller 200 determines a desired operating state of each cylinder with respect to the fuel that will be provided to each cylinder, and appropriately commands the various fuel injectors and, if applicable, spark devices in each cylinder such that each cylinder may operate fully on diesel fuel, in a mixed fuel condition that uses a mixture of diesel and gaseous fuel, or on gaseous fuel alone. Where diesel fuel is used to entirely operate the cylinder, or in mixture with the gaseous fuel, ignition may be provided by compression ignition of the diesel that is present in the cylinder. In the case where gaseous fuel is entirely used, ignition may be provided from the spark device.

In the illustrated embodiment, the controller 200 includes at least an RPM input 202 that is indicative of a speed of the engine, for example, a signal such as what is provided by the sensor 140 (FIG. 1). The controller 200 also includes inputs indicative of a first fuel rate 204, for example, a rate of diesel fuel that is provided to the engine, and a second fuel rate 206, for example, a rate of gaseous fuel that is provided to the engine. Together, the first and second fuel rates 204 and 206 represent a total fuel consumption of the engine, which is indicative of engine load. In an alternative embodiment, a determination of the engine load may be based on cylinder pressure and/or detonation. Together with the RPM input 202, the first and second fuel rates 204 and 206 are provided to a mode determinator 208, which determines an operating state of the engine, in real time, in terms of engine speed and load.

The RPM input 202 is provided to a determinator function 210. The first and second fuel rates 204 and 206 are provided to a normalizer function 212, which weighs the relative fuel amounts of each type used and determines an overall energy input 214 to the engine. The overall energy input 214 along with the RPM 202 and, optionally, other parameters which are omitted for simplicity, are provided to the determinator function 210. The determinator function 210 calculates, estimates, looks up, interpolates or otherwise determines a desired engine cylinder operating mode based on the then present operating point in terms of engine speed and load.

In the illustrated embodiment, the determinator function determines how many engine cylinders in the engine may operate using diesel, a mixture of diesel and gaseous fuel, or gaseous fuel only, depending on engine operating conditions. For example, at certain engine operating conditions, the determinator function may call for one group of engine cylinders to operate in a dual fuel mode, i.e., using gaseous fuel with a diesel pilot for ignition, and for a second group of cylinders to operate entirely on the gaseous fuel, with provision of a spark for ignition.

Figure 3:
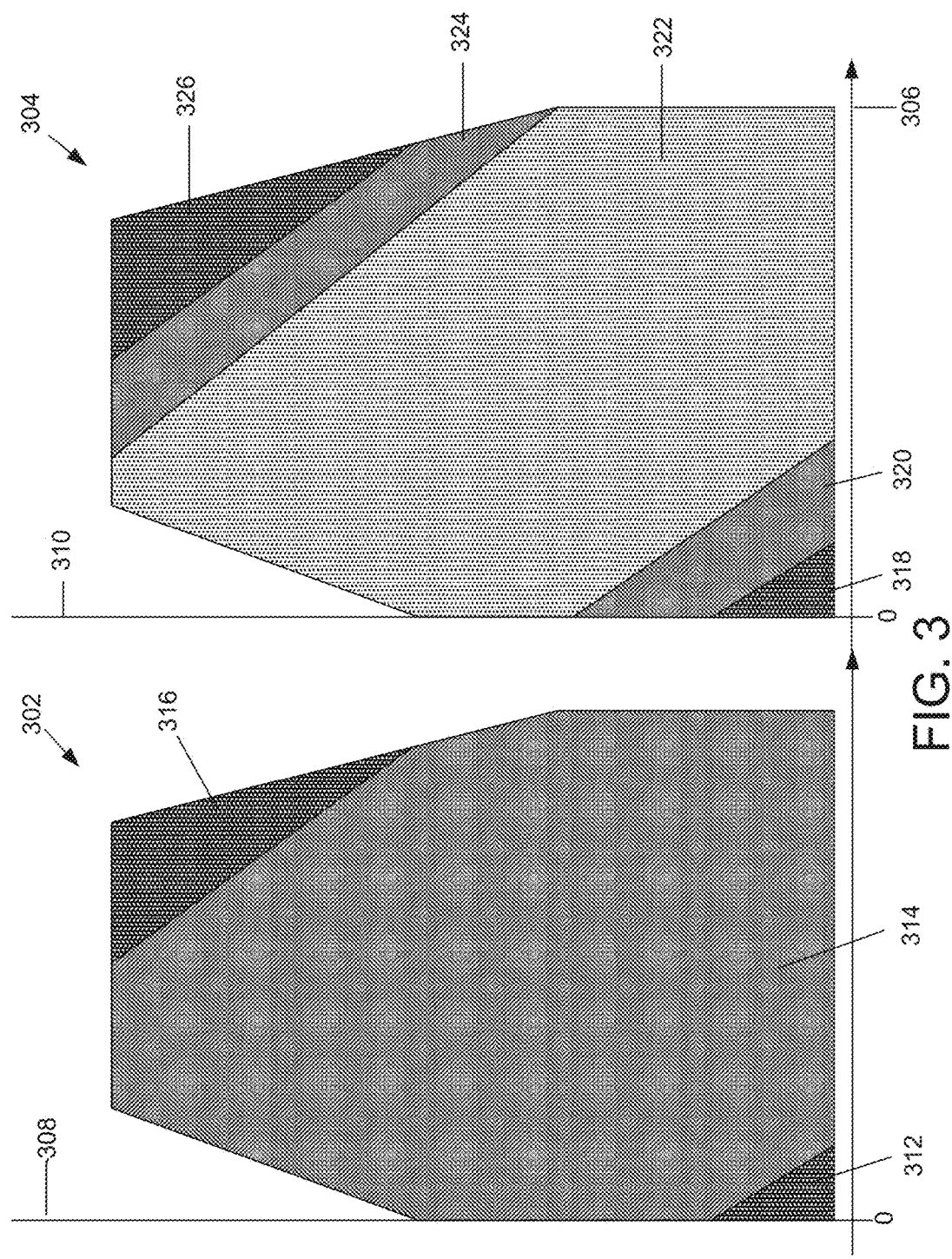
FIG. 3 is a qualitative set of engine map charts in accordance with the disclosure.

A qualitative map of engine operating modes for two groups of cylinders is shown in FIG. 3, where the fuel used over an engine map for a first grouping of cylinders is shown on the left, and for a second grouping of cylinders on the right. While these maps are shown for illustrative purposes, it should be appreciated that they can be present in the determinator function 210 in tabular form. Alternatively, the determinator function 210 may be embodied as a model-based algorithm or any other analytical methodology. As shown in the graphs, a first engine map 302 shown in the left may be used to determine the operating mode of a first grouping of engine cylinders, for example, the cylinders 108 of the first bank 103 as shown in FIG. 1. A second engine map 304 shown on the right may be used to determine the operating mode of a second grouping of engine cylinders, for example, the cylinders 108 of the second bank 104 as shown in FIG. 1. Alternatively, the same engine cylinders may dynamically switch between the first and second cylinder groupings, i.e., any one engine cylinder may operate under a first grouping mode in one combustion cycle, and then switch to operation under a second grouping mode in the next combustion cycle, in an alternating fashion.

Both the first and second engine maps 302 and 304 are plotted against a horizontal axis 306, which represents engine speed, and a respective vertical axis 308 and 310, each of which represents engine load. Accordingly, when information about a particular set of engine operating parameters in terms of engine speed and engine load are provided to the determinator function, that set of engine operating parameters will be understood as an engine operating point that can be located on each of the first and second engine maps 302 and 304. Various regions or collections of engine operating points may thus be defined in each of the first and second engine maps 302 and 304, where the engine operating points belonging to each region have similar operating characteristics, at least in terms of the fueling strategy employed for the different engine cylinder groupings, in this case, the first and second engine cylinder groupings.

With reference to the engine maps shown in FIG. 3, first engine map includes a low engine speed, low engine load region, or a first region 312. The first region 312 may extend between an idle engine speed and an engine speed that is about 10% of the maximum rated engine speed, and engine loads between 0 and 10%. The first region 312 encompasses a collection of engine operating points at which each of the first grouping of engine cylinders operates entirely on diesel fuel, or at least a majority of the fuel provided to those cylinders is diesel fuel rather than gaseous fuel although some gaseous fuel may also be provided. As can be seen from the juxtaposed first and second engine maps 302 and 304, the second grouping of cylinders may also operate in the same fashion over a corresponding first region 318. The first regions 312 and 318 in the first and second engine maps 302 and 304 indicate that operation of the engine at low engine speeds and loads may be more stable at the various engine operating environments with diesel fuel. At times during engine operation, one group of engine cylinders may operate under the first engine map, and a second group of engine cylinders may operate under the second engine map, simultaneously and independently from the first group of cylinders. It should be appreciated, however, that more than two engine groups of engine cylinders may also operate at the same time under different combustion modes.

The first engine map includes a high engine speed, high engine load region, or a second region 316. The second region 316 may extend between relatively high engine speeds of between 50 and 85% of the maximum rated engine speed, and engine loads from 60 to 100% of a rated load. The second region 316 encompasses a collection of engine operating points at which each of the first grouping of engine cylinders operates entirely on diesel fuel, or at least a majority of the fuel provided to those cylinders is diesel fuel rather than gaseous fuel although some gaseous fuel may also be provided. As can be seen from the juxtaposed first and second engine maps 302 and 304, the second grouping of cylinders may also operate in the same fashion over a corresponding second region 326. The second regions 316 and 326 in the first and second engine maps 302 and 304 indicate that operation of the engine at high engine speeds and high or rated loads may be more stable at the various engine operating environments with diesel fuel because of the relatively higher energy content of diesel fuel per volume as compared to the gaseous fuel.

Where the first and second engine maps 302 and 304 differ is in the corresponding regions between the first and second regions 312 and 316 in the first engine map 302, and 318 and 326 in the second engine map 304. In the first engine map 302, a third region 314 occupies the space between the first and second regions 312 and 316. The third region 314 encompasses a collection of engine operating points at which each of the first grouping of engine cylinders operates in a dual fuel mode, in which gaseous fuel makes up the majority of the fuel provided to the cylinders and an amount of diesel is provided for ignition. The relative ratio of gaseous to diesel fuel may be adjusted in different areas of the third region 314 depending on engine operating environmental factors such as altitude, temperature and the like.

In the second engine map 304, the area between the first and second regions may be subdivided into fourth region 320, a fifth region 322, and a sixth region 324. The fourth and sixth regions 320 and 324 represent a collection of engine operating points at which each of the second grouping of engine cylinders operates in a dual fuel mode, in which like the third region 314 gaseous fuel makes up the majority of the fuel provided to the cylinders and an amount of diesel fuel is provided for ignition. In the illustrated embodiment, the fourth region 320 extends between 10 and 20% of the maximum engine speed operating range, and also between 10 and 20% of the maximum engine load range. Similarly, the sixth region 324 is present adjacent the corresponding second region 326 and spans over a range of 10 to 15% of engine speed and load.

The fifth region 322 encompasses a collection of engine operating points between the fourth and sixth regions 320 and 324 and represents engine operating points at which each of the cylinders belonging to the second grouping of engine cylinders operates entirely and gaseous fuel and ignition is provided by activating a spark device such as the spark devices as shown in FIG. 1. As can be appreciated, in the second engine map 304 the fourth and sixth regions 320 and 324 provide transitions between operation in a diesel only mode in the first region 318 or the second region 326 and operation in a gaseous fuel only mode in the fifth region 322. The size and shape of any of the regions shown in the first and second engine maps 302 and 304 may be adjusted depending on the particular shape of the engine map for a given engine application and also to provide improved emissions.

Returning now to FIG. 2, the determinator function 210 provides a command 216 that contains information for the desired operating mode of each engine cylinder. The various engine cylinders are represented in the block diagram collectively at 218 and are numbered as 1, 2, and so forth. In the illustrated embodiment, n engine cylinders are represented. Each of the cylinders that are represented on the diagram within 218, includes a control module that deciphers the command signal 216 and relays appropriate commands to at least three systems in the engine that includes a diesel command 220, a gas command 222, and a spark command 224.

Depending on the particular command for a cylinder operating mode, the particular control module may provide the diesel command 220 to the diesel injector to provide diesel into the corresponding cylinder that is sufficient to operate the cylinder at a desired load output when the engine is operating in either the first or second regions 312 and 316 as shown in FIG. 3. Similarly, the particular control module may provide a diesel command 220 to the diesel injector to provide diesel fuel into the corresponding cylinder in a dual fuel operating mode such as the operating modes represented by the third, fourth and sixth regions 314, 320 and 324 as shown in FIG. 3.

The particular control module for each cylinder may provide a gas command 222 two one or more gaseous fuel valves or injectors to provide gaseous fuel into the corresponding cylinder that is sufficient to operate the cylinder at a desired load output when the engine is operating in either the third fourth and sixth regions 314, 320 and 324 in the presence of diesel fuel as described above relative to FIG. 3, or when the engine is operating in the fifth region 322 with gaseous fuel alone. As previously discussed, operation of the corresponding cylinder and gaseous fuel alone will also prompt a spark command 224 to be provided to that cylinder at an appropriate time to ignite the gaseous fuel and operate the cylinder. While each of the control modules marked 1 through n in FIG. 2 is capable, arranged and configured to operate its corresponding engine cylinder in any operating mode, the commands constructing each control module to operate the cylinder in a particular fashion is provided through the command signal 216 from the determinator function 210 based on the then present engine operating point and also the information that is determined or predefined within the first and second engine maps 302 and 304.

INDUSTRIAL APPLICABILITY

Figure 4:
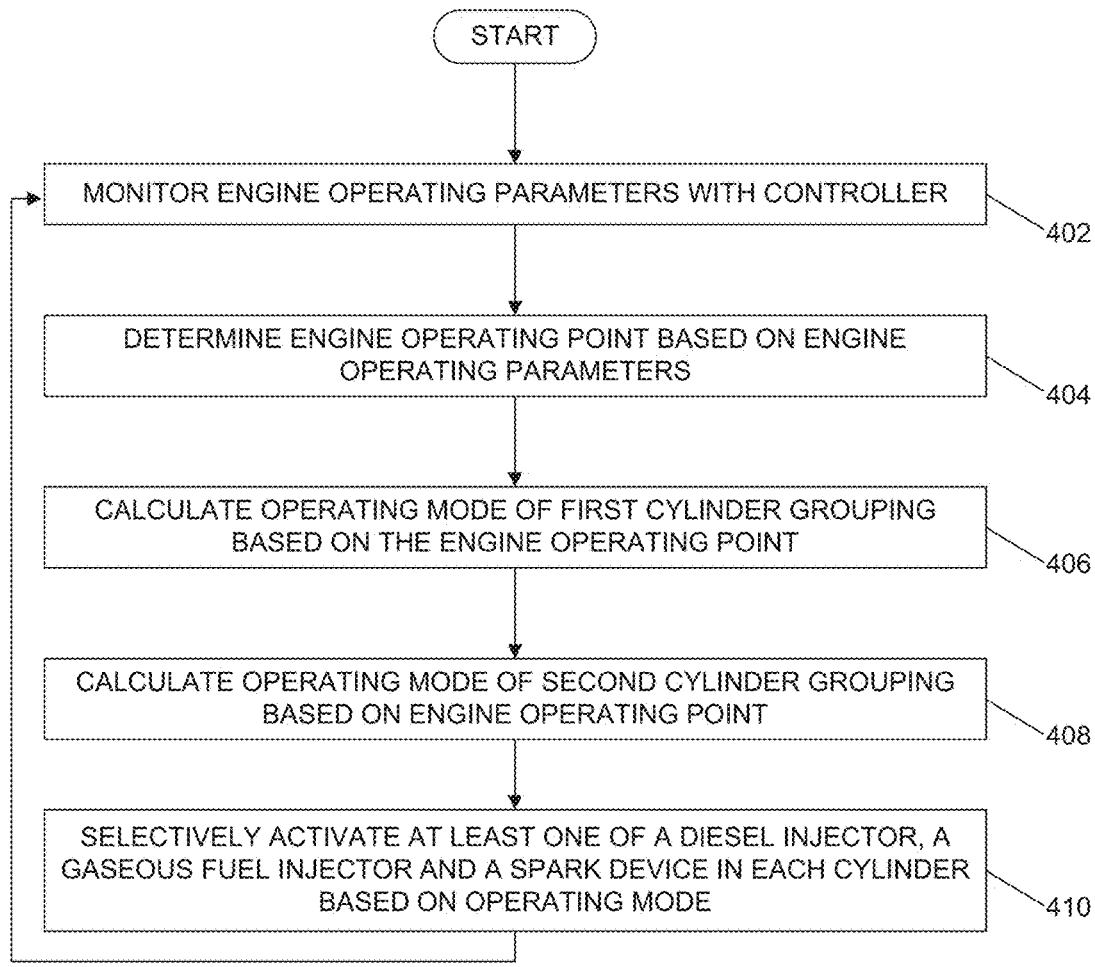
FIG. 4 is a flowchart for a method of operating an internal combustion engine in accordance with the disclosure.

This disclosure generally relates to dual fuel internal combustion engines. The embodiments described herein specifically relative to engines operating on natural gas, liquefied petroleum gas (LPG), biogas, or any other combustible fuel, alone or in combination with diesel fuel. A flowchart for a method of operating an internal combustion engine shown in FIG. 4. The method includes monitoring engine operating parameters with the controller at 402. As previously described, the engine operating parameters can include engine speed and an indication of fuel consumption which can be used to infer engine load. As can be appreciated, other methods can be used to determine engine load such as parameters relating to the devices or systems that are connected to and driven by the engine. For example, in the case of a generator, an electrical power output of the a generator can be used to determine engine load.

The electronic controller uses information about engine operating parameters to determine an engine operating point at 404. Determination of the engine operating point can be carried out in any appropriate fashion including providing engine speed and load information to an engine map the corresponds to a particular grouping of engine cylinders such as the engine maps shown in FIG. 3. Based on the engine operating point, the controller calculates a desired operating mode of two or more different engine cylinder groupings based on the engine operating point. In the exemplary embodiment discussed above, there are two different cylinder groupings, and the controller calculates the operating mode for each. As also discussed above, the cylinder operating mode for each grouping can include operation of each cylinder that belongs to that particular grouping in a first mode, which includes operation and diesel fuel only, a second mode, which includes operation with both diesel and gaseous fuel, and a third mode, which includes operation with a gaseous fuel only that is ignited using a spark.

Once the particular mode of operation has been determined for each engine cylinder, the controller selectively activates at least one of a diesel injector, a gaseous fuel injector and a spark device in each engine cylinder based on the operating mode determined or otherwise selected for each particular cylinder. In other words, whether in groupings or individually, the controller is programmed and configured to operate each individual engine cylinder separately from the others in terms of the type of fuel and the type of combustion that is carried out in that particular cylinder for each particular engine cycle.

Operation of individual cylinders or groupings of cylinders in the described fashion under different fueling modes is advantageous in that it provides the capability of operating different cylinders at different emission levels. For example, operation in a gaseous fuel mode only can be used to provide low nitrous oxide emissions. When the emissions from all the cylinders in the engine are aggregated, the overall engine emissions will be lower based on the contributions of the different engine cylinder groupings than the corresponding emissions would be if all engine cylinders were operating in the same combustion mode while also providing a desired engine load output at a given engine speed.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. An internal combustion engine, comprising:
at least one cylinder case forming a plurality of cylinders, the plurality of cylinders including a first grouping of cylinders and a second grouping of cylinders, each of the plurality of cylinders including a primary fuel injector, a secondary fuel injector and a spark device;
a primary fuel supply connected to each of the primary fuel injectors and including a primary fuel supply sensor, the primary fuel supply sensor configured to provide a primary fuel supply signal indicative of a rate of supply of a primary fuel to the engine through the primary fuel supply;
a secondary fuel supply connected to each of the secondary fuel injectors and including a secondary fuel supply sensor, the secondary fuel supply sensor configured to provide a secondary fuel supply signal indicative of a rate of supply of a secondary fuel to the engine through the secondary fuel supply;
an output shaft including a speed sensor, the speed sensor configured to measure an engine speed and to provide a speed signal;
an electronic controller operably associated with each of the primary fuel injectors, each of the secondary fuel injectors and each of the spark devices, the electronic controller disposed to receive the primary and secondary fuel supply signals and the speed signal,
wherein the electronic controller is programmed and operates to:
determine a first fueling mode for the first grouping of cylinders and a second fueling mode for the second grouping of cylinders independently based on the primary and secondary fuel supply signals and the speed signal:

wherein the electronic controller is programmed and operates to:

determine a first fueling mode for the first grouping of cylinders and a second fueling mode for the second grouping of cylinders independently based on the primary and secondary fuel supply signals and the speed signal:

wherein the first fueling mode is a dual-fuel operating mode in which the primary and secondary fuel injectors both provide amounts of their respective fuels into each of the plurality of cylinders belonging to the first grouping of cylinders with ignition provided by compression; and wherein the secondary fuel is a gaseous fuel and wherein, in the second fueling mode each of the plurality of cylinders is operated on gaseous fuel with ignition provided by the spark device.

2. The internal combustion engine of claim 1, wherein the electronic controller is further configured to independently and selectively activate at least one of the primary fuel injector, the secondary fuel injector and the spark device for each of the first and second groupings of cylinders so that, at times, the first grouping of cylinders operates in the first fueling mode and the second grouping of cylinders operates in the second fueling mode, the first and second fueling modes being different from one another.

3. The internal combustion engine of claim 1, wherein the at least one cylinder case is shaped in a Vee configuration that includes a first cylinder bank and a second cylinder bank.

4. The internal combustion engine of claim 3, wherein the first cylinder grouping consists of cylinders arranged along the first cylinder bank and wherein the second cylinder grouping consists of cylinders arranged along the second cylinder bank.

5. The internal combustion engine of claim 3, wherein the first cylinder grouping includes cylinders arranged along both the first and second cylinder banks, and wherein the second cylinder grouping consists of cylinders arranged along the first and second cylinder banks in alternating fashion with cylinders of the first cylinder grouping.

6. A method for operating an internal combustion engine, comprising:

monitoring engine operating parameters with an electronic controller;

determining an engine operating point based on the engine operating parameters;

calculating a first operating mode of a first cylinder grouping based on the engine operating point;

calculating a second operating mode of a second cylinder grouping based on the engine operating point; and selectively activating at least one of a diesel injector, a gaseous fuel injector and a spark device in each engine cylinder separately and selectively for each cylinder of the first and second cylinder grouping based on the engine operating point:

wherein the first operating mode includes operating a first grouping of cylinders on one of diesel only mode, a dual fuel mode in which diesel and a gaseous fuel are provided to each of the grouping of cylinders, and a gaseous fuel only mode in which gaseous fuel is ignited by a spark provided by the spark device in each of the first grouping of cylinders; and wherein the second operating mode includes operating a second grouping of cylinders on one of the diesel only mode, the dual fuel mode in which diesel and a gaseous fuel are provided to each of the second grouping of cylinders, and the gaseous fuel only mode in which gaseous fuel is ignited by a spark provided by the spark device in each of the second grouping of cylinders; and wherein the first operating mode is different than the second operating mode.

7. The method of claim 6, wherein monitoring engine operating parameters includes monitoring an engine speed and determining an engine load.

8. The method of claim 6, further comprising independently and selectively activating a fueling mode for each of the first and second groupings of cylinders.

9. An internal combustion engine, comprising:

at least one cylinder case forming a plurality of cylinders, the plurality of cylinders including a first grouping of cylinders and a second grouping of cylinders, each of the plurality of cylinders including a primary fuel injector, a secondary fuel injector and a spark device;

an output shaft including a speed sensor, the speed sensor configured to measure an engine speed and to provide a speed signal;

an electronic controller programmed and operating to:

determine a fueling mode for each of the first and second groupings of cylinders independently so that the first grouping of cylinders operates in a first fueling mode and the second grouping of cylinders operates in a second fueling mode, the first and second fueling modes being different from one another:

wherein the first fueling mode is a dual-fuel operating mode in which primary and secondary fuel injectors both provide amounts of their respective fuels into each of the plurality of cylinders belonging to the first grouping of cylinders with ignition provided by compression; and wherein in the second fueling mode, each of the plurality of cylinders is operated on gaseous fuel with ignition provided by a spark device.

10. The internal combustion engine of claim 9, further comprising:

a primary fuel supply connected to each of the primary fuel injectors and including a primary fuel supply sensor, the primary fuel supply sensor configured to provide a primary fuel supply signal indicative of a rate of supply of a primary fuel to the engine through the primary fuel supply;

a secondary fuel supply connected to each of the secondary fuel injectors and including a secondary fuel supply sensor, the secondary fuel supply sensor configured to provide a secondary fuel supply signal indicative of a rate of supply of a secondary fuel to the engine through the secondary fuel supply.

11. The internal combustion engine of claim 10, wherein the at least one cylinder case is shaped in a Vee configuration that includes a first cylinder bank and a second cylinder bank.

12. The internal combustion engine of claim 11, wherein the first cylinder grouping consists of cylinders arranged along the first cylinder bank and wherein the second cylinder grouping consists of cylinders arranged along the second cylinder bank.

13. The internal combustion engine of claim 11, wherein the first cylinder grouping includes cylinders arranged along both the first and second cylinder banks, and wherein the second cylinder grouping consists of cylinders arranged along the first and second cylinder banks in alternating fashion with cylinders of the first cylinder grouping.

* * * * *